United States Patent
Chludzinski et al.

(10) Patent No.: US 8,873,917 B2
(45) Date of Patent: Oct. 28, 2014

(54) LOW BEND LOSS OPTICAL FIBER

(75) Inventors: Paul Andrew Chludzinski, Hampstead, NC (US); Dominick Fiordimalva, Wilmington, NC (US); Peter Gottfried Hebgen, Wilmington, NC (US); Snigdharaj Kumar Mishra, Wilmington, NC (US); Sonya Marie Raney, Wrightsville Beach, NC (US)

(73) Assignee: Corning Incorporated, Corning, NY (US)

( * ) Notice: Subject to any disclaimer, the term of this patent is extended or adjusted under 35 U.S.C. 154(b) by 258 days.

(21) Appl. No.: 13/473,654

(22) Filed: May 17, 2012

(65) Prior Publication Data
US 2012/0294575 A1 Nov. 22, 2012

Related U.S. Application Data

(60) Provisional application No. 61/488,423, filed on May 20, 2011.

(51) Int. Cl.
G02B 6/036 (2006.01)
G02B 6/02 (2006.01)

(52) U.S. Cl.
CPC ........ *G02B 6/03672* (2013.01); *G02B 6/02223* (2013.01)
USPC ........................................................ 385/127

(58) Field of Classification Search
CPC ........................... G02B 6/03627; G02B 6/0365
See application file for complete search history.

(56) References Cited

U.S. PATENT DOCUMENTS

| | | | |
|---|---|---|---|
| 4,641,917 A | 2/1987 | Glodis et al. |
| 4,852,968 A | 8/1989 | Reed |
| 5,056,888 A | 10/1991 | Messerly et al. |
| 5,721,800 A | 2/1998 | Kato et al. |
| 6,009,221 A | 12/1999 | Tsuda |
| 6,175,680 B1 | 1/2001 | Arai et al. |
| 6,363,196 B1 | 3/2002 | Rousseau et al. |
| 6,625,362 B2 | 9/2003 | Inagaki et al. |
| 6,842,566 B2 | 1/2005 | Ishikawa et al. |
| 6,901,196 B2 | 5/2005 | Takahashi et al. |
| 6,904,218 B2 | 6/2005 | Sun et al. |
| 6,999,667 B2 | 2/2006 | Jang et al. |

(Continued)

FOREIGN PATENT DOCUMENTS

| | | |
|---|---|---|
| EP | 2175295 | 4/2010 |
| JP | 2007-108764 | 4/2007 |
| WO | 2009104724 | 8/2009 |

OTHER PUBLICATIONS

Machine Translation of JP2007-108764.

(Continued)

*Primary Examiner* — Jerry Rahll
(74) *Attorney, Agent, or Firm* — Robert L Carlson

(57) ABSTRACT

An optical fiber includes a central glass core region comprising maximum refractive index delta percent $\Delta_1$, a first inner annular region surrounding said core comprising refractive index delta percent $\Delta_2$, a depressed annular region surrounding said inner annular region and comprising $\Delta_3$ and a third annular region surrounding the depressed annular region comprising refractive index delta percent $\Delta_4$; wherein the third annular region comprises chlorine an amount greater than 0.2 weight percent in a region which is within 5 microns from the depressed annular region, wherein $\Delta_{1MAX} > \Delta_4 > \Delta_2 > \Delta_3$. The difference between $\Delta_4$ and $\Delta_2$ is greater than 0.01 and profile volume, $|V_3|$ is at least 50% $\Delta\mu m^2$.

9 Claims, 2 Drawing Sheets

(56) References Cited

U.S. PATENT DOCUMENTS

| | | | |
|---|---|---|---|
| 7,043,125 | B2 | 5/2006 | Diep et al. |
| 7,164,835 | B2 | 1/2007 | Matsuo et al. |
| 7,203,397 | B2 | 4/2007 | Ouchi et al. |
| 7,239,784 | B2 | 7/2007 | Hayami et al. |
| 7,366,387 | B2 | 4/2008 | Matsuo et al. |
| 7,440,663 | B2 | 10/2008 | Matsuo et al. |
| 7,505,657 | B2 | 3/2009 | Matsuo et al. |
| 7,526,168 | B2 | 4/2009 | Matsuo et al. |
| 7,526,169 | B2 | 4/2009 | Bickham et al. |
| 7,689,085 | B1 * | 3/2010 | Mishra ............ 385/127 |
| 2002/0186941 | A1 | 12/2002 | Hsu et al. |
| 2003/0016927 | A1 | 1/2003 | Soufiane et al. |
| 2003/0190127 | A1 | 10/2003 | Sillard et al. |
| 2003/0223716 | A1 | 12/2003 | Christoff et al. |
| 2004/0114892 | A1 | 6/2004 | Chiang et al. |
| 2005/0175303 | A1 | 8/2005 | Jang et al. |
| 2005/0180709 | A1 | 8/2005 | Park et al. |
| 2005/0185906 | A1 | 8/2005 | Bickham et al. |
| 2006/0115224 | A1 | 6/2006 | Kutami et al. |
| 2007/0189684 | A1 | 8/2007 | Matsuo et al. |
| 2007/0189699 | A1 | 8/2007 | Matsuo et al. |
| 2008/0101755 | A1 | 5/2008 | Matsuo et al. |

OTHER PUBLICATIONS

Machine Translation of WO2009104724.
PCT/US2010/047610 Search Report.

* cited by examiner

LOW BEND LOSS OPTICAL FIBER

CROSS-REFERENCE TO RELATED APPLICATIONS

This application claims the benefit of priority under 35 U.S.C. §119 of U.S. Provisional Application Ser. No. 61/488,423 filed on May 20, 2011, the content of which is relied upon and incorporated herein by reference in its entirety.

BACKGROUND

The disclosure relates to optical fiber, and more particularly to single mode optical fibers which have low bend loss at 1550 nm.

Low bend loss optical fibers are attractive for fiber to the home applications because they can lower the installation costs. To reduce the bending loss, profile designs with a fluorine doped ring or randomly distributed voids have been proposed. However, it is challenging to achieve bend insensitive fiber and at the same time to meet G.652 or other fiber standards (MFD, cable cutoff, dispersion, etc.).

SUMMARY

Single mode optical fibers are disclosed herein which include a central glass core region comprising maximum refractive index delta percent $\Delta_1$, a first inner annular region surrounding said core comprising refractive index delta percent $\Delta_2$, a depressed annular region surrounding said inner annular region and comprising $\Delta_3$ and a third annular region surrounding the depressed annular region comprising refractive index delta percent $\Delta_4$, wherein the third annular region comprises chlorine an amount greater than 0.2 weight percent in a region which is within 5 microns from the depressed annular region, wherein $\Delta_{1MAX} > \Delta_4 > \Delta_2 > \Delta_3$. The depressed index region comprises a profile volume, $V_3$, equal to:

$$2 \int_{R_2}^{R_3} \Delta(r) r \, dr;$$

The region of the cladding adjacent to the moat (negative index) region is very sensitive and effective in reducing cutoff. A proper shape of the updoped third annular region refractive index profile helps to reduce cutoff while maintaining low bend performance. The updoping of the third annular region cladding can have chlorine levels, in the region which is immediately adjacent to the depressed annular region, which is greater than 0.2, more preferably greater than 0.25, even more preferably greater than 0.275, and most preferably greater than about 0.3 wt percent.

In some embodiments, the difference between $\Delta_4$ and $\Delta_2$ is greater than 0.01 and the magnitude of the profile volume $|V_3|$ is at least 50% $\Delta\mu m^2$, more preferably greater than 60% $\Delta\mu m^2$. The fiber preferably exhibits a cable cutoff less than 1260 nm, and a bend loss at 1550 nm, when wound on a 10 mm diameter mandrel, of less than 0.2 dB/turn, more preferably less than 0.1 dB/turn, even more preferably less than 0.075 dB/turn, and most preferably less than 0.05 dB/turn.

In some preferred embodiments, the fiber core refractive index profile is designed so that the fiber exhibits a zero dispersion wavelength between 1300 and 1324 nm a mode field diameter between about 8.2 and 9.5 microns at 1310 nm, and a cable cutoff less than 1260 nm.

The optical fiber may comprise a central glass core region comprising maximum refractive index delta percent $\Delta_1$, a first inner annular region surrounding said core comprising refractive index delta percent $\Delta_2$, a depressed annular region surrounding said inner annular region and comprising $\Delta_3$ and a third annular region surrounding the depressed annular region comprising refractive index delta percent $\Delta_4$; said depressed annular region having a profile volume, $V_3$, equal to:

$$2 \int_{R_2}^{R_3} \Delta(r) r \, dr;$$

wherein the central glass core region comprises a maximum refractive index delta percent $\Delta_1$ and radius $r_1$ sufficient to result in a mode field diameter of greater than 8.2 microns at 1310 nm, and wherein the magnitudes of the difference between $\Delta_4$ and $\Delta_2$ and the magnitude of $|V_3|$ are both sufficiently large to result in a 22 m cable cutoff less than 1260 nm and a bend loss at 1550 nm, when wound on a 10 mm diameter mandrel, of less than 0.2 dB/turn, more preferably less than 0.1 dB/turn, even more preferably less than 0.075 dB/turn, and most preferably less than 0.05 dB/turn. The magnitudes of the difference between $\Delta_4$ and $\Delta_2$ is preferably greater than 0.01, more preferably greater than 0.02, even more preferably greater than 0.05. In some embodiments the difference between $\Delta_4$ and $\Delta_2$ is greater than 0.08. Preferably the difference between $\Delta_4$ and $\Delta_2$ is less than 0.1. In some embodiments the difference between $\Delta_4$ and $\Delta_2$ is preferably greater than 0.01 and less than 0.1. In some embodiments the difference between $\Delta_4$ and $\Delta_2$ is preferably greater than 0.01 and less than about 0.05. The depressed annular region preferably comprises a profile volume $V_3$ such that $|V_3|$ is at least 50% $\Delta\mu m^2$, more preferably greater than 60% $\Delta\mu m^2$, even more preferably greater than about 65% $\Delta\mu m^2$, and in some cases greater than about 70% $\Delta\mu m^2$ or 80% $\Delta\mu m^2$. In some embodiments, the depressed annular region profile volume $V_3$ so that $|V_3|$ is less than about 120% $\Delta\mu m^2$, more preferably less than about 100% $\Delta\mu m^2$.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
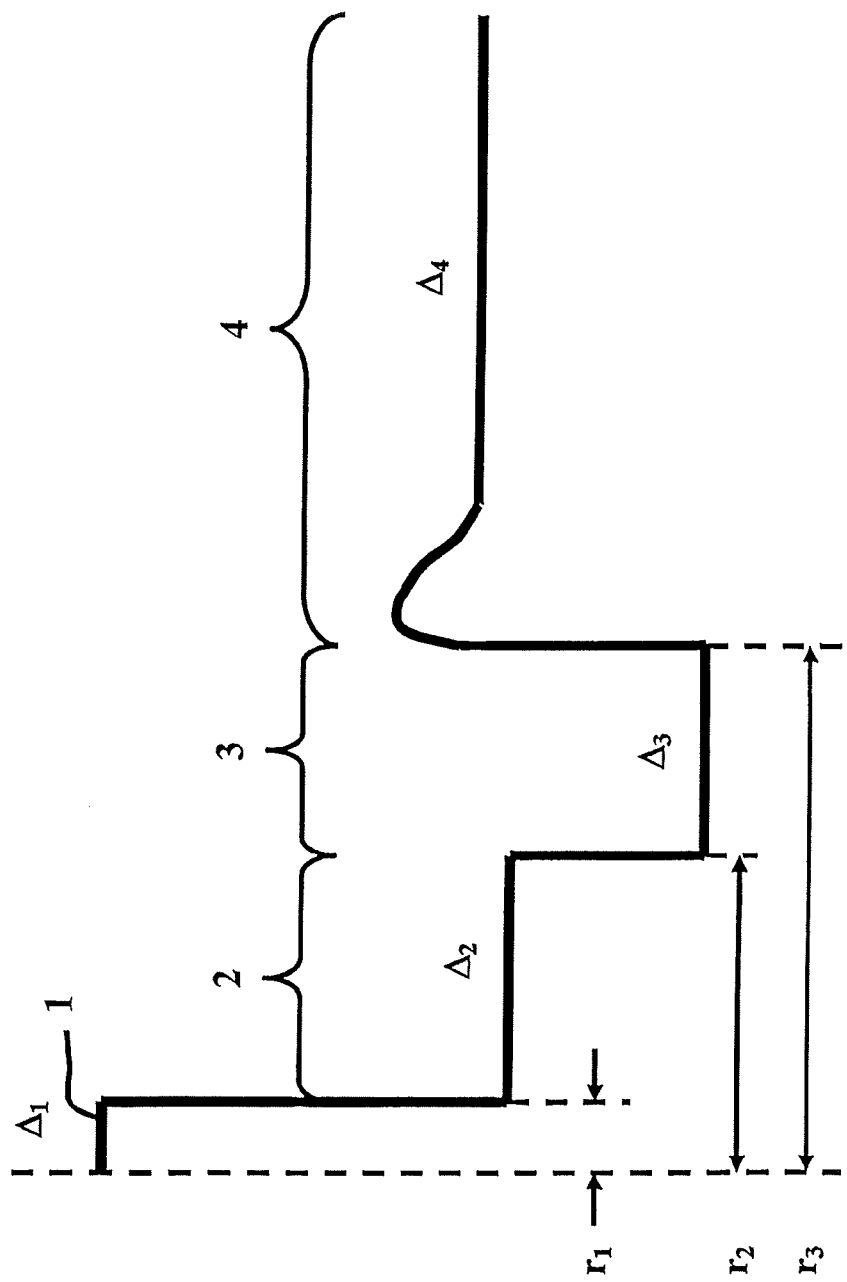
FIG. 1 illustrates an exemplary refractive index profile of one exemplary embodiment of optical fiber.

Reference will now be made in detail to the present preferred embodiment(s), an example of which is/are illustrated in the accompanying drawings. Whenever possible, the same reference numerals will be used throughout the drawings to refer to the same or like parts.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, and as used herein $n_c$ is the average refractive index of undoped silica. As used herein, the relative refractive index is represented by $\Delta$ and its values are given in units of "%", unless otherwise specified. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$, $Al_2O_3$, $P_2O_5$, $TiO_2$, Cl, Br. Examples of down dopants include fluorine and boron.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength.

The term "α-profile" or "alpha profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)\%$ is zero, and r is in the range $r_i \le r \le r_f$, where $\Delta$ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2 = (2\int f^2 \, r \, dr / \int [df/dr]^2 \, r \, dr)$, the integral limits being 0 to ∞.

The bend resistance of a waveguide fiber can be gauged by induced attenuation under prescribed test conditions, for example by deploying or wrapping the fiber around a mandrel of a prescribed diameter, e.g., by wrapping 1 turn around either a 6 mm, 10 mm, or 20 mm or similar diameter mandrel (e.g. "1×10 mm diameter macrobend loss" or the "1×20 mm diameter macrobend loss") and measuring the increase in attenuation per turn.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards, more commonly known as FOTP's.

One exemplary fiber 10 is shown in FIG. 1, includes a central glass core region 1 comprising maximum refractive index delta percent $\Delta_1$. A first inner annular region 2 surrounds central core region 1, the first inner annular region 2 comprising refractive index delta percent $\Delta_2$. A depressed annular region 3 surrounds first inner annular region 2 and comprises $\Delta_3$. A third annular region 4 surrounds the depressed annular region 3 and comprises refractive index delta percent $\Delta_4$. In preferred embodiments, $\Delta_1 > \Delta_4 > \Delta_2 > \Delta_3$. In the embodiment illustrated in FIG. 1, regions 1, 2, 3, and 4 are immediately adjacent one another. However, this is not required, and alternatively additional core or cladding regions may be employed. For example, an outer cladding region (not shown) may be employed which surrounds annular region 4 and comprises a lower refractive index delta percent $\Delta_5$ than annular region 4.

Central core region 1 comprises an outer radius $r_1$ which is defined as where a tangent line drawn through maximum slope of the refractive index of central core region 1 crosses the zero delta line. Core region 1 preferably exhibits a refractive index delta percent, $\Delta_1$, between about 0.2 to 0.5, more preferably between about 0.25 to 0.45. In some embodiments, $\Delta_1$ is preferably between 0.30 to 0.40. Core radius $r_1$ is preferably between 3 and 5 microns, more preferably between about 3.5 to 4.5 microns. Central core region 1 preferably comprises an alpha between about 10-100.

In the embodiment illustrated in FIG. 1, first annular region 2 surrounds central core region 1 and comprises inner radius $r_1$ and outer radius $r_2$, $r_1$ being defined as above and $r_2$ being defined as where a tangent line drawn through the maximum slope of the refractive index of the inner refractive index portion of annular region 3 crosses the zero delta line. In some cases the refractive index in region 2 is essentially flat. In other cases there can be a gradient index profile. Still in other cases there can be fluctuations as a result of small profile design or process variations. In some embodiments, the first annular portion comprises silica which is substantially undoped with either fluorine or germania, i.e., such that the region is essentially free of fluorine and germania. First annular region 2 comprises refractive index delta percent $\Delta_2$ which is calculated using:

$$\Delta_2 = \int_{r1}^{r2} \Delta(r) dr / (r_2 - r_1)$$

The first inner annular region preferably exhibits a width between about 4 to 10 microns, more preferably between about 5 to 7 microns. The ratio of the core radius $r_1$ over the inner annular region 2 radius $r_2$ is preferably between about 0.35 to 0.55, more preferably between about 0.40 to 0.50.

Depressed annular region 3 comprises inner radius $r_2$ and outer radius $r_3$, $r_3$ being defined as the point between region 3 and region 4 at which the refractive index delta is zero. Depressed annular region 3 preferably comprises a delta percent between about −0.3 to −1, more preferably −0.35 to −0.7, and most preferably −0.4 to −0.6.

Depressed region 3 comprises a profile volume, $V_3$, equal to:

$$V_3 = 2 \int_{r2}^{r3} \Delta(r) r \, dr$$

Preferably, $|V_3|$ is at least 50% $\Delta\mu m^2$, more preferably greater than 60% $\Delta\mu m^2$, even more preferably greater than about 65% Δμm², and in some cases greater than about 70% Δμm² or 80% Δμm². In some cases it may be desireable to maintain the depressed annular region profile volume $V_3$ so that $|V_3|$ is less than 120% Δμm², more preferably less than 100% Δμm². Depressed annular region 3 comprises refractive index delta percent $\Delta_3$ which is calculated by $\int \Delta(r)dr/(r3-r2)$ between r2 and r3. The depressed-index annular portion may, for example, comprise glass comprising a plurality of voids, or glass doped with a downdopant such as fluorine, boron or mixtures thereof, or glass doped with one or more of such downdopants and additionally glass comprising a plurality of voids. In some preferred embodiments, the depressed-index annular portion is comprised of fluorine doped silica glass. In cases where the cladding includes voids, the voids in some embodiments may be non-periodically located within the depressed-index annular portion. By "non-periodically located", we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match. That is, the voids or voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. It is believed that the voids extend along the length of the fiber a distance less than 20 meters, more preferably less than 10 meters, even more preferably less than 5 meters, and in some embodiments less than 1 meter. Optical fiber disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids therein. As used herein, the diameter of a hole is the longest line segment whose endpoints are disposed on the silica internal surface defining the hole when the optical fiber is viewed in perpendicular cross-section transverse to the longitudinal axis of the fiber.

Third annular region 4 surrounds the depressed annular region 3 and comprises refractive index delta percent $\Delta_4$ which is higher than the index $\Delta_2$ of first annular region 2, thereby forming a region which is an "updoped" region 4 with respect to inner annular region 2. The updoping is preferably achieved via chlorine doped silica. The inner radius r3 of third annular region is defined as the point between region 3 and region 4 at which the refractive index delta is zero. The higher index region of third annular region 4 preferably begins at the point where depressed annular region 3 ends, i.e., at $r_3$. The refractive index delta percent $\Delta_4$ of region 4 is calculated by $\int \Delta(r)dr/\int dr$ between inner radius of $r_3$ and the outer radius of the third annular region 4. Annular region 4 comprises a higher refractive index than first inner annular region 2. Preferably, the higher index portion (compared to first inner region 2) of annular region 4 extends at least to the point where the optical power which would be transmitted through the optical fiber is greater than or equal to 90% of the optical power transmitted, more preferably to the point where the optical power which would be transmitted through the optical fiber is greater than or equal to 95% of the optical power transmitted, and most preferably to the point where the optical power which would be transmitted through the optical fiber is greater than or equal to 98% of the optical power transmitted. In preferred embodiments, the "updoped" third annular region extends at least to a radial point outside of where the majority of the light within the fiber is being transmitted, e.g., to at least a radial point of about 30 microns. Consequently, the volume $V_{4A}$ of the third annular region 4, which is defined as the volume calculated between the inner radius $R_3$ of the "updoped" third annular region 4 and a radial distance of 30 microns, is $$V_{4A} = 2\int_{r3}^{r30} \Delta_{(4-2)}(r)rdr$$

Preferably, $V_{4A}$ is greater than 5, more preferably greater than 7, and in some embodiments greater than 10% Δμm². The volume $V_{4A}$ of the third annular region 4 may be less than the volume $V_{4B}$ of the third annular region 4, volume $V_{4B}$ as used herein being calculated from $R_3$ to 62.5 microns (i.e., the outer diameter of the 125 micron diameter fiber). In some cases, volume $V_{4B}$ may be greater than 80% Δμm², greater than 200% Δμm², or greater than 300% Δμm².

Third annular region 4 is immediately adjacent to annular region 3, as shown in FIG. 1. Annular region 4 may extend to the outer most radius of the optical fiber. In some embodiments, $\Delta_4$ of the third annular region is greater than 0.01 percent. In some embodiments, the refractive index $\Delta_4$ of the third annular region is greater than 0.01 percent when compared to that of the inner annular region 2. In some embodiments, the third annular region 4 comprises chlorine levels which are higher in the region immediately adjacent to the depressed annular region 3, and slightly lower at regions further spaced from depressed annular region 3. Preferably, the chlorine level in the region which is immediately adjacent to the depressed annular region is greater than 0.2, more preferably greater than 0.25, even more preferably greater than 0.275, and most preferably greater than about 0.3 wt percent. For example, the third annular region in some preferred embodiments comprises chlorine greater than 0.2, more preferably greater than 0.25, even more preferably greater than 0.275, and most preferably greater than about 0.3 wt percent weight percent in a region which is within 5 microns from the depressed annular region. In some embodiments, the third annular region comprises chlorine greater than 0.2, more preferably greater than 0.25, even more preferably greater than 0.275, and most preferably greater than about 0.3 wt percent weight percent in a region which is within 3 microns from the depressed annular region. In addition, in some embodiments, the third annular region comprises chlorine an amount less than 0.3 weight percent in a region which is greater than 3 microns from the depressed annular region. In some embodiments, the third annular region comprises chlorine an amount less than 0.3 weight percent in a region which is greater than 5 microns from the depressed annular region. Preferably, substantially no germania is employed in third annular region 4, and more preferably no germania is employed in third annular region 4. Otherwise, attenuation of the fiber will increase.

The average chlorine concentration in the updoped third annular region can be increased, for example, by manufacturing this region using the OVD deposition process, and doping the OVD deposited soot using chlorine gas or $SiCl_4$ gas. Increasing the chlorine gas concentration during sinter and employing a higher soot density in regions where has a lower level of chlorine content for the same updope process. The levels of chlorine which occurs in various portions of third annular region 4 may be controlled by controlling the soot density across this region during the OVD soot deposition step. For example, localized high levels of chlorine will correspond to regions of lower soot density.

Figure 2:
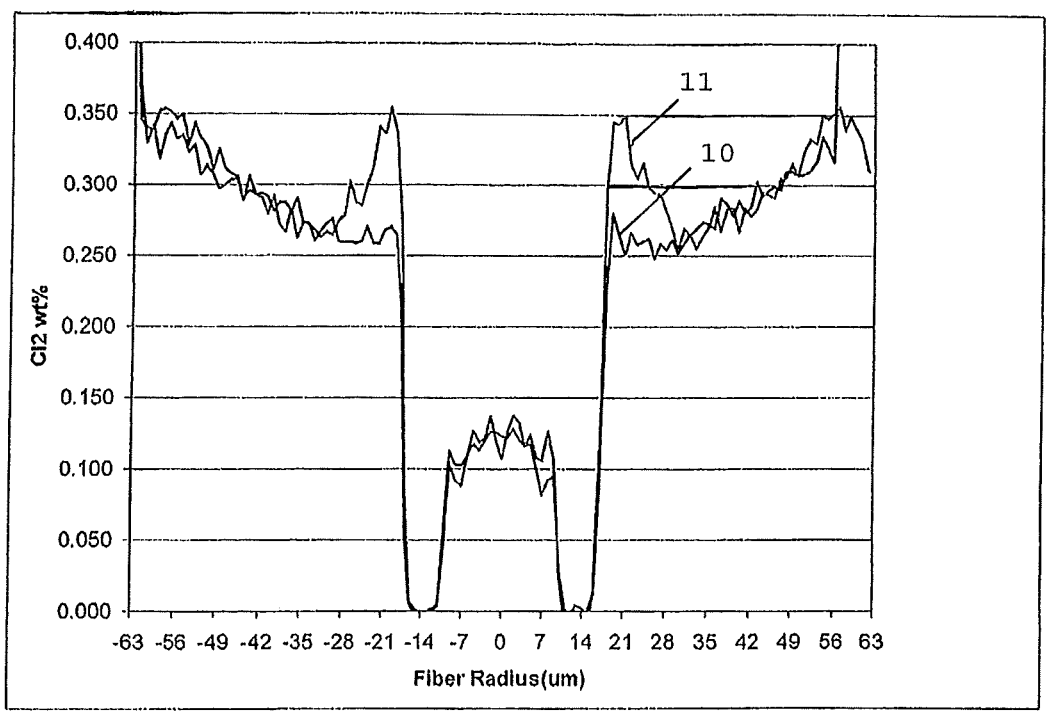
FIG. 2 illustrates chlorine content vs. radius for two fibers having refractive index profiles similar to that shown in FIG. 1.

The closer the Cl2 is located next to the negative index region of the moat increases its impact on lowering the cable cutoff wavelength. FIG. 2 illustrates chlorine content vs. radius for two fibers, both having a refractive index profile similar to that shown in FIG. 1, except that profile 11 has a noticeable increased chlorine concentration, compared to the profile 10, directly adjacent to the moat region (the moat is located between about 0.1 and 0.2 normalized radius), but aside from the Cl concentration profiles are similar. The fibers having the Cl concentration of profile 11 exhibited a 15-20 nm lower cutoff than the fibers having the Cl concentration of curve 10, but still yielded the same bend performance as the fiber of curve 10.

All of these fibers described herein would exhibit a cable (22 m) cutoff wavelength less than 1260 nm. These fibers exhibit a cable cutoff less than 1260 nm and a bend loss of less than 0.2 dB/turn when wound on a 10 mm diameter mandrel. These fibers also exhibit a mode field diameter between about 8.2 and 9.5 microns at 1310 nm, a zero dispersion wavelength between 1300 and 1324 nm a mode field diameter between about 8.2 and 9.5 microns at 1310 nm, a dispersion slope at 1310 nm which is less than 0.09 ps/nm²/km, and a bend loss at 1550 nm, when wound on a 10 mm diameter mandrel, of less than 0.2 dB/turn, more preferably less than 0.1 dB/turn, even more preferably less than 0.075 dB/turn, and most preferably less than 0.05 dB/turn. These fibers also exhibit a bend loss at 1550 nm, when wound on a 15 mm diameter mandrel, of less than 0.1 dB/turn, more preferably less than 0.05 dB/turn, most preferably less than 0.03 dB/turn, a 20 mm diameter mandrel, of less than 0.06 dB/turn, more preferably less than 0.03 dB/turn, and a 30 mm diameter mandrel, of less than 0.01 dB/turn, more preferably less than 0.005 dB/turn, most preferably less than 0.003 dB/turn. These fibers also exhibit zero dispersion wavelength is not reported for these examples, this wavelength was in all cases between 1300 and 1324 nm.

It is to be understood that the foregoing description is exemplary only and is intended to provide an overview for the understanding of the nature and character of the fibers which are defined by the claims. The accompanying drawings are included to provide a further understanding of the preferred embodiments and are incorporated and constitute part of this specification. The drawings illustrate various features and embodiments which, together with their description, serve to explain the principals and operation. It will become apparent to those skilled in the art that various modifications to the preferred embodiments as described herein can be made without departing from the spirit or scope of the appended claims.

What is claimed is:

1. An optical fiber comprising:
a central glass core region comprising maximum refractive index delta percent $\Delta_1$, a first inner annular region surrounding said core comprising refractive index delta percent $\Delta_2$, a depressed annular region surrounding said inner annular region and comprising $\Delta_3$ and a third annular region surrounding the depressed annular region comprising refractive index delta percent $\Delta_4$; wherein the third annular region comprises chlorine an amount greater than 0.2 weight percent in a region which is within 5 microns from the depressed annular region, wherein $\Delta_{1MAX} > \Delta_4 > \Delta_2 > \Delta_3$, wherein the difference between $\Delta_4$ and $\Delta_2$ is greater than or equal to 0.01 and a profile volume, $V_3$, equal to:

$$V_3 = 2\int_{r2}^{r3} \Delta(r) r\, dr$$

wherein $|V_3|$ is at least 50% $\Delta\mu m^2$, and said fiber exhibits a cable cutoff less than 1260 nm.

2. The optical fiber of claim 1, wherein the third annular region comprises chlorine an amount greater than 0.3 weight percent in said region which is within 5 microns from the depressed annular region.

3. The optical fiber of claim 1, wherein the third annular region comprises chlorine an amount greater than 0.3 weight percent in a region which is within 3 microns from the depressed annular region.

4. The optical fiber of claim 1, wherein the third annular region is essentially free of germanium oxide.

5. The optical fiber of claim 1, wherein said fiber exhibits a bend loss of less than 0.2 dB/turn at 1550 nm when wound on a 10 mm diameter mandrel.

6. The optical fiber of claim 1, wherein the third annular region comprises chlorine an amount less than 0.3 weight percent in a region which is greater than 3 microns from the depressed annular region.

7. The optical fiber of claim 1, wherein said fiber exhibits zero dispersion at a wavelength between 1300 and 1324 nm.

8. The optical fiber of claim 1, wherein said fiber exhibits a mode field diameter of greater than 8.2 microns at 1310 nm.

9. The optical fiber of claim 1, wherein said fiber exhibits a bend loss of less than 0.1 dB/turn at 1550 nm when wound on a 10 mm diameter mandrel.

* * * * *